(12) United States Patent
Dominguez et al.

(10) Patent No.: US 8,595,040 B2
(45) Date of Patent: Nov. 26, 2013

(54) ASSOCIATE RISK ANALYSIS

(75) Inventors: Roberto J. Dominguez, High Point, NC (US); Kolt Bell, Charlotte, NC (US); Susan M. Sullivan, Lowell, MA (US)

(73) Assignee: Bank of America Corporation, Charlotte, NC (US)

( * ) Notice: Subject to any disclaimer, the term of this patent is extended or adjusted under 35 U.S.C. 154(b) by 138 days.

(21) Appl. No.: 13/227,307

(22) Filed: Sep. 7, 2011

(65) Prior Publication Data

US 2013/0060589 A1 Mar. 7, 2013

(51) Int. Cl.
*G06Q 20/00* (2012.01)

(52) U.S. Cl.
USPC .................. 705/7; 705/35; 705/36 R; 705/39; 705/40

(58) Field of Classification Search
USPC .................................. 705/7, 35, 36 R, 39, 40
See application file for complete search history.

(56) References Cited

U.S. PATENT DOCUMENTS

| | | | | |
|---|---|---|---|---|
| 7,415,431 | B2 * | 8/2008 | Pintsov ........................... | 705/32 |
| 7,877,278 | B1 * | 1/2011 | Leonardo et al. ................ | 705/4 |
| 8,036,978 | B1 * | 10/2011 | Saavedra-Lim ............... | 705/38 |
| 8,073,785 | B1 * | 12/2011 | Candella et al. ................ | 705/75 |

* cited by examiner

*Primary Examiner* — Nga B. Nguyen
(74) *Attorney, Agent, or Firm* — Weiss & Arons LLP; Michael Springs

(57) ABSTRACT

Methods and apparatus according to the invention are directed towards providing means for identifying a selection of entity associates that may contain a perpetrator of claimed fraud against an entity account. Means are also provided for scoring the associates within the selection as to relative likelihood of being the perpetrator. Identification means and scoring means may include analyses of the number and nature of connections associates may have with the frauded account, with other entity accounts, with past claims of fraud, and with other associates.

23 Claims, 4 Drawing Sheets

ASSOCIATE RISK ANALYSIS

FIELD OF TECHNOLOGY

This invention relates to fraud detection within the financial services industry. More specifically, this invention relates to the field of identification and assessment of financial services industry associates suspected of perpetrating fraud against accounts.

BACKGROUND OF THE INVENTION

The financial services industry is a prime target for fraud. Large sums of money are exchanged through a vast number of transactions. Those transactions are executed through multiple steps exhibiting various sets of security risks. One such set of risks is presented by dishonest industry associates.

A financial services associate may have access to numerous customer accounts. A dishonest associate may take advantage of that access to perpetrate fraud.

Grand-scale frauds perpetrated by unscrupulous associates have been the focus of public attention. Less well known to the public, but of ongoing concern and mounting cost to financial services institutional entities, is endemic smaller scale fraud.

Often committed by low-profile associates, such as bank tellers, smaller scale fraud may not be readily detectable. Over time, serial small-scale fraudsters may inflict significant losses upon customers and entities.

The efficient identification of likely perpetrators of fraud of any scale may benefit customers and entities.

The process of identification may begin with a financial services industry entity receiving a claim from a customer that his or her account has been frauded. The fraud claim may be required to conform with various criteria of claim receiving and of claim content. The criteria of receiving may include passing typical security tests of validation of the claim's identification of the customer and account allegedly frauded.

The criteria of content may include confirmation of a transaction having been transacted on a date alleged in the claim and of the transaction having been of an amount in congruence with the claim. With computer-mediated precise time-stamping and automatic recordation of account numbers and of transaction types and amounts now routinely carried out in financial service entities such as banks, such criteria of content may provide for the claimed fraudulent transaction to be directly unambiguously traced back to the perpetrating entity associate or associates.

In other cases, the scope, trustworthiness and/or precision of the criteria of content may be wanting. The dates of fraudulent transactions may be unknown, as when fraud may have been serially perpetrated over time prior to the customer taking notice of its cumulative effect. In such cases, fraudulent amounts per transaction may not be well delineated and/or may not be clearly discerned by the customer. In these and other cases of insufficiency of criteria of content, a host of means—ranging from methods of yesteryear to sophisticated novella of the digital cyber-age—may have been employed by perpetrators of such fraud to cover their steps.

A fraud claim for which criteria of content are insufficient to directly unambiguously identify the fraud-perpetrating associate(s), may pose a challenge for entity internal investigation. Inefficiencies of stymied investigations may contribute to ongoing damage of the financial standing and reputation of customers and entities.

It would, therefore, be desirable for financial services entities to have means for efficiently identifying likely fraud-perpetrating associates. Likewise, expeditious means for assessing ("scoring") the risk posed by each such likely perpetrator would be desirable.

SUMMARY OF THE INVENTION

It is an object of the present invention to provide means for identifying a selection of likely fraud-perpetrating entity associates. It is also an object of this invention to provide means for scoring the risk posed by each such likely perpetrator. Together, the identification means and scoring means may be referred to as associate risk analysis.

Fraud claims for which criteria of content are insufficient to directly unambiguously identify the fraud-perpetrating associate(s), may yet lead to identification of the likely perpetrator(s) through application of the identification means provided by this invention. Application of the identification means may narrowly limit the size of a set of selected associates likely to include the fraud-perpetrating associate(s). The scoring means presented herein may indicate within that narrowly limited set the associate(s) most likely to be the perpetrator(s). Obtaining such a set of risk-assessed associates through the associate risk analysis of this invention, may expedite subsequent entity internal investigation of the claim, to the benefit of customers and entities.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
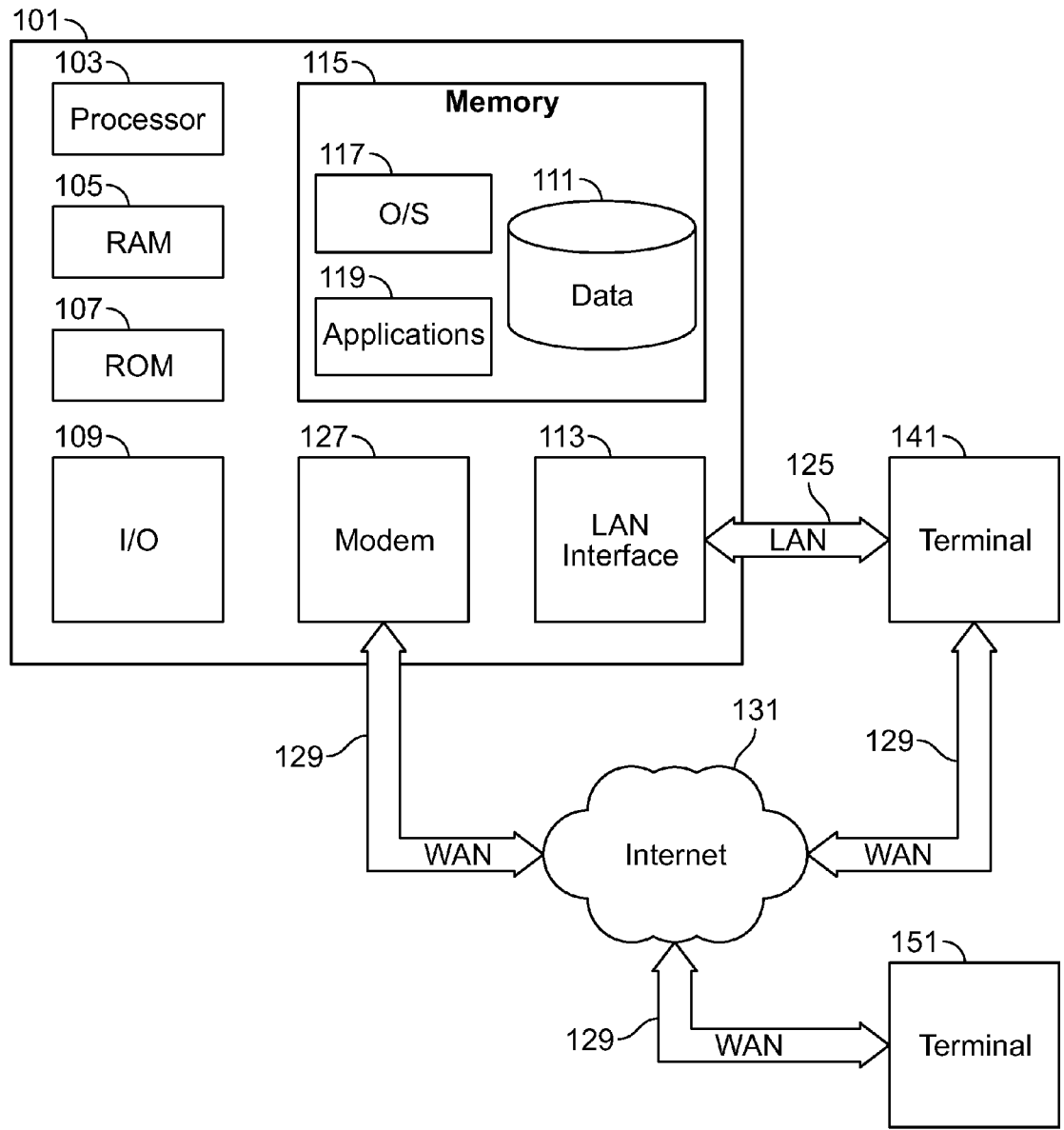
FIG. 1 is a block diagram of hardware apparatus that may be used in accordance with the principles of the invention.

Apparatus, methods and media for selecting entity associates for an entity internal investigation are provided. The apparatus may include, and the methods and media may involve, a receiver for receiving from a customer a fraud claim in connection with an entity account. The entity account may be included in a plurality of entity accounts. The customer may be logically linked with the entity account.

The apparatus may include, and the methods and media may involve, a logic processing unit for identifying an entity associate that conforms to a first criterion and a second criterion. The first criterion may be a logical link between the associate and an access event. The access event may be an accessing of the entity account. The second criterion may be a logical link between the associate and a number of past claims that may be greater than a threshold number. One or more of the past claims may correspond to one or more of the plurality of entity accounts.

The received fraud claim may be required to conform with criteria of impact. Criteria of impact may include the above-mentioned criteria of claim receiving and criteria of claim content. Valuations of such criteria of impact may be logically linked with the claim. Such linking may include recordation of the valuations regarding the claim. Such records may include the identity of the customer, the identity of the entity account, the date of receiving the claim, and/or the monetary amount of the claim. Such recordation may become part of a collection of records of information regarding the claim. Such records may be in electronic form, as may be any record herein-mentioned.

To be considered for associate risk analysis, a claim may have to conform with additional criteria of impact set by the entity. Such additional criteria of impact may include the claimed amount being above a method selectable minimum monetary amount. For example, the monetary amount may be selected such that a claim may only be considered for associate risk analysis should the claimed amount exceed $250.

The collection of records of information regarding the claim may contain information obtained in the course of associate risk analysis and of claim-related investigation. Such information may include the identity of all entity associates identified as connected with any entity account of the claim. Such information may include identification of other accounts connected through the analysis and/or investigation with the associates and/or with the customer account of the claim. The collection of records may also contain records of entity internal evaluations of the degree of suspicion, urgency and/or other attributes attached to the claim in the course of associate risk analysis and/or investigation.

Subsequent to associate risk analysis and/or investigation being performed in regard to the claim, the claim may be deemed a past claim. The collection of records of information regarding the claim may be stored as one of a plurality of such collections. Entity internal claims databases may comprise such a plurality of collections of records of information regarding past claims. Entity internal claims databases containing claims information equivalent or similar to the above-described may be available prior to implementation of associate risk analysis. Claims databases may contain past claims that have not been subjected to associate risk analysis.

A given past claim that may be contained in claims databases may, for various purposes, become the subject of associate risk analysis. Such purposes may include demonstration and/or calibration of associate risk analysis. Such purposes may include revisiting and/or reviewing of previously received claims.

Entity internal customer/accounts databases may comprise collections of records of information regarding customers and their accounts. Such records may contain information regarding entity relevant personal data of individual customers, including a customer's signature, the customer's entity internal Personal Identification Number (PIN) and/or a listing of the customer's entity accounts.

Entity internal transactional databases may comprise collections of records of information regarding details of transactions involving each of the plurality of accounts. Such records may contain information regarding transactional data of each account, including a time-stamp and monetary amount of each transaction, and/or identification of any associates handling the transaction.

Entity internal databases may contain information used in performance of associate risk analysis.

One of several criteria by which associate risk analysis may identify an entity associate for selection may, as mentioned above, be the existence of a logical link between the associate and an accessing of the account of the claim. The transactional databases may be checked for information regarding accessing of the account. Records of transactions involving the account of the claim may be checked for transactions marked in the recordation as having been handled by associates. A transaction handled by an associate need not have had a monetary amount transacted to be marked as being associate handled. A handling may comprise the act of opening or closing or in any fashion accessing the account. A logical link between an associate and an accessing of the account may comprise a handling of a transaction of the customer account of the claim by an associate.

Another criterion of selection for identifying an entity associate may be the existence of a logical link between the associate and an accessing of any entity account of the customer. The customer/accounts databases and transactional databases may be checked to identify all entity accounts of the customer and to identify each handling of any of those accounts by any associate. Such a handling may be termed an access event. A logical link between an associate and an accessing of an account of the customer may comprise an access event.

The access event may be required to have occurred within a method selectable maximum time period prior to the fraud claim. For example, the maximum time period may be selected from a range of one month to one year. The time period may be selected to begin from the date of the fraud claim being received or from the date of a fraud being alleged in the claim.

The time period for access events involving the customer account of the claim may be different from the time period for access events involving other entity accounts of the customer. For example, the time period for access events involving the customer account of the claim may be 45 days, while the time period for access events involving any other account of the customer may be six months.

A further criterion for identifying an entity associate may, as mentioned above, be the existence of a logical link between the associate and a non-zero number of past claims. The claims databases may be checked for information regarding associates connected with past claims. A logical link between an associate and a past claim may comprise any one such connection.

An associate both conforming to the criterion of being linked to an access event involving the account of the customer and conforming to the criterion of being linked to at least the threshold number of past claims, may be identified for selection. The past claims being considered may be limited to those claims that have occurred within a method selectable maximum time period prior to the fraud claim, the maximum time period ranging, for example, from two days to two months. The number of such past claims may be required to meet or exceed a method selectable threshold number of claims, where the threshold number may, for example, range from one to ten. For example, the threshold and the time period of the further criterion may be selected such that the further criterion may comprise the existence of a link between the associate and at least one past claim that predates the fraud claim by no more than 14 days.

The past claims being considered may also be limited to those claims that are each connected to a number of entity associates that does not exceed a method selectable threshold number of associates. The threshold number of associates may, for example, range from one to one hundred associates or up to a method selectable percentage of the entity associates potentially implicated by the claim. Building on the preceding example, the threshold number of associates may be selected such that the logical link may, for example, be between the associate and at least one past claim that predates the fraud claim by no more than 14 days and that is connected to no more than five associates.

The threshold number of associates may be a cutoff within a collection of numbers comprising, for all the past claims, the number of associates connected with each past claim. For example, the number of associates linked to any past claim may range from 2 to 50, with the bottom 25% of those numbers being, for example, in the range of 2 to 10. In that example, the threshold number of associates may be selected as the top of the bottom-most 25% of the collection, such that the link may be with at least a selected number of past claims, each of which is linked to a number of associates no greater than 10. The past claims considered for the collection of numbers may be those past claims that occurred within a maximum time period prior to the fraud claim. Building on the immediately preceding example, the threshold number of associates may be selected such that the link may, for example, be with a selected number of past claims, each of which is linked to a number of associates no greater than 10 and each of which predates the fraud claim by no more than 14 days.

One or more of the various thresholds described may be selected and adjusted to produce an effective match of the identification means to such factors as the size of the entity, the scope of the received claim and/or the desired speed and granularity of the selection. For a given received claim, the identification means may be run iteratively with different setting of the thresholds to achieve sets of selected associates meeting different specific criteria of size and/or composition.

Application of the criteria of the identification means to the selection of an associate for subsequent entity internal investigation may yield a plurality of selected associates. A means of differentiating among the selected associates of the plurality by scoring each selected associate may be provided by the apparatus, method and media of associate risk analysis. On the basis of the scoring, an associate with a low score relative to other associates of the plurality may be unselected from the plurality. The scoring means of associate risk analysis may expedite subsequent investigation.

Scoring may be based at least partly on data obtained through the identification means of selecting each associate. In the identification means, a datum attached to an associate may contribute to the selection of the associate on the basis of the value of the datum relative to an appropriate selection criterion threshold. A selected associate may conform with the criteria of selection through the valuation of each relevant datum attached to the associate being more than (or equal to) a selected minimum threshold or less than (or equal to) a selected maximum threshold. Particulars of the valuation of each such datum above the minimum threshold or below the maximum threshold may be irrelevant to the identification means. (Such thresholds may be thought of as being similar to selection cutoffs of academic "pass/fail grading" methods.)

In the scoring means of associate risk analysis, however, particulars of the valuation of each such datum above the minimum threshold or below the maximum threshold may be directly relevant. Such valuations may contribute at least in part to a measure of relative risk of the selected associate compared to other selected associates. (Such measures may be thought of as being similar to measures of academic class standing indicated by letter grades or number grades.)

Because the scoring means of associate risk analysis may be based at least partly on data obtained through the identification means of selecting each associate, at least part of the scoring means may be implemented concurrently with the identification means. Additional data to be attached to a selected associate for purposes of scoring that may not be data used in performance of the identification means may be obtained from the latter data or from the databases checked during the identification means.

Categories of data involved in the scoring means may include access events and past claims. The scoring means may attach to a selected associate a cumulative score comprising a weighted average, with method selectable weighting factors, of the values of all or some of the various data items. Alternatively or additionally, the scoring means may attach to a selected associate a category score corresponding to one or more categories comprising a weighted average, with method selectable weighting factors, of the values of data items per category. Alternatively or additionally, the scoring means may attach to a selected associate a separate value corresponding to one or more individual data items.

Some of the data items of the scoring may include access events with which the associate may be linked. The access events may include access events of the associate accessing the customer account of the claim. The access events may include access events of the associate accessing any other entity account of the customer. The access events data items on which the scoring may be based at least in part, may include a time elapsed between an access event and the fraud claim. The access events data items on which the scoring may be based at least in part, may include a time elapsed between access events. The access events data items on which the scoring may be based at least in part, may include a duration of one or more of the access events.

Some of the data items of the scoring may include past claims with which the associate may be linked. The past claims data items on which the scoring may be based at least in part, may include the number of those past claims. The past claims data items on which the scoring may be based at least in part, may include the number of distinct customers linked with those past claims. The past claims data items on which the scoring may be based at least in part, may include the number of entity associates linked with one or more of those past claims. The past claims data items on which the scoring may be based at least in part, may include one or more entity internal impact measures of one or more of those claims. An impact measure of a claim may correspond to a monetary valuation attached to the claim. Alternatively or additionally, an impact measure of a claim may correspond to an evaluation of the degree of suspicion, urgency and/or other attributes attached to the claim in the course of associate risk analysis of that claim and/or of any investigation of that claim.

Methods and apparatus according to the invention are directed towards providing to the internal investigative division of a financial services entity, such as a bank, information-gathering and information-processing modalities for identifying and scoring fraud-perpetrating associates.

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 115.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 111. Alternatively, some or all of server 101 computer executable instructions may be embodied in hardware or firmware (not shown).

Application programs 119 used by server 101 may contain, according to an illustrative embodiment of the invention, computer executable instructions for implementing associate risk analysis.

Database 111 used by server 101 may provide, according to an illustrative embodiment of the invention, centralized storage of the information comprising the entity internal claims databases, customer/accounts databases and transactional databases, allowing interoperability of associate risk analysis between different elements of the entity residing at different physical locations.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 may be connected to LAN 125 through a network interface or adapter 113. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119 used by server 101, according to an illustrative embodiment of the invention, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Server 101, according to an illustrative embodiment of the invention, may implement associate risk analysis as a process or set of process within server 101 and/or distributed over one or more remote network-linked computers, such as terminals 141 and 151 shown in FIG. 1.

Figure 2:
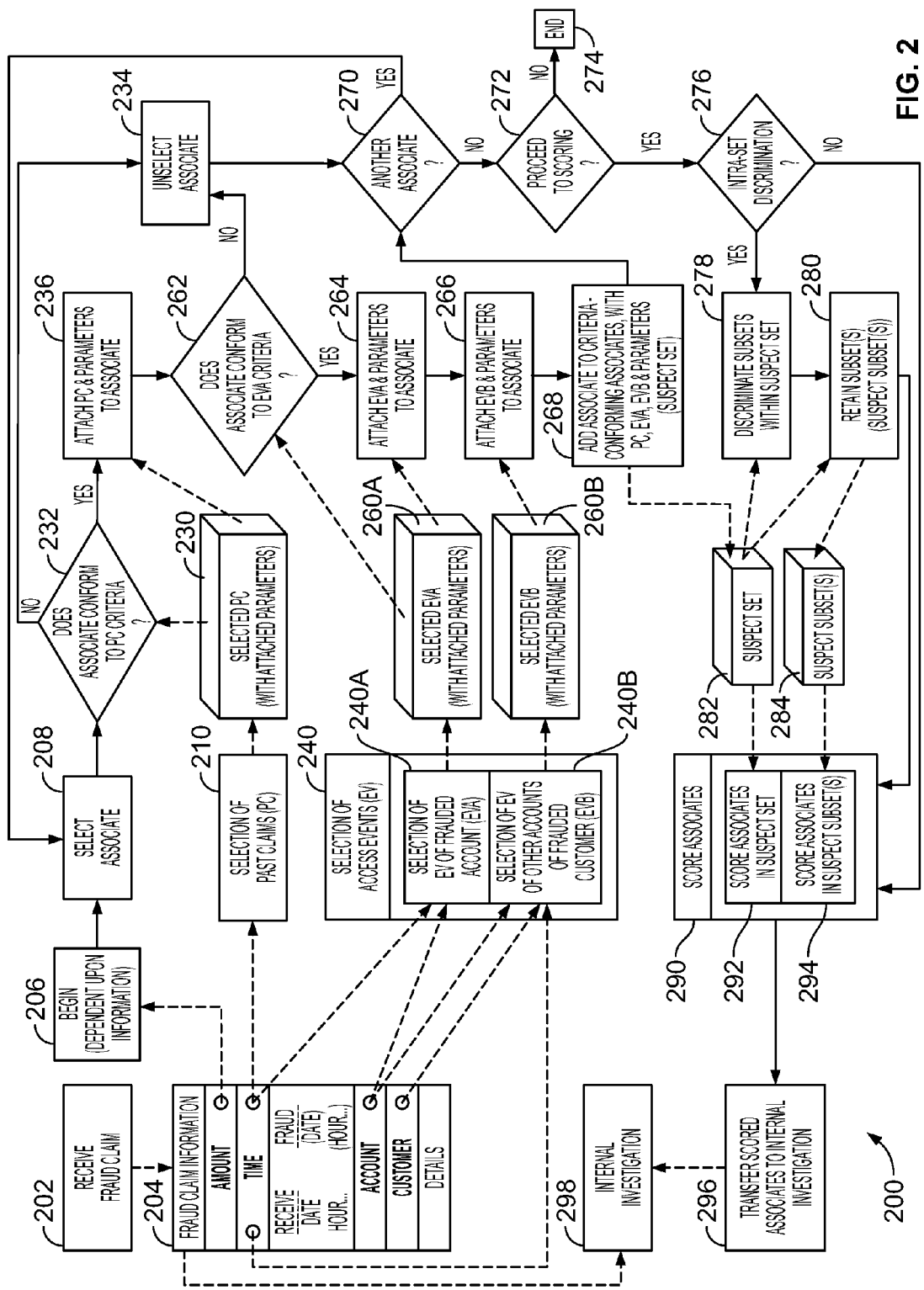
FIG. 2 is an illustrative flow diagram of a process in accordance with the principles of the invention.
Figure 3:
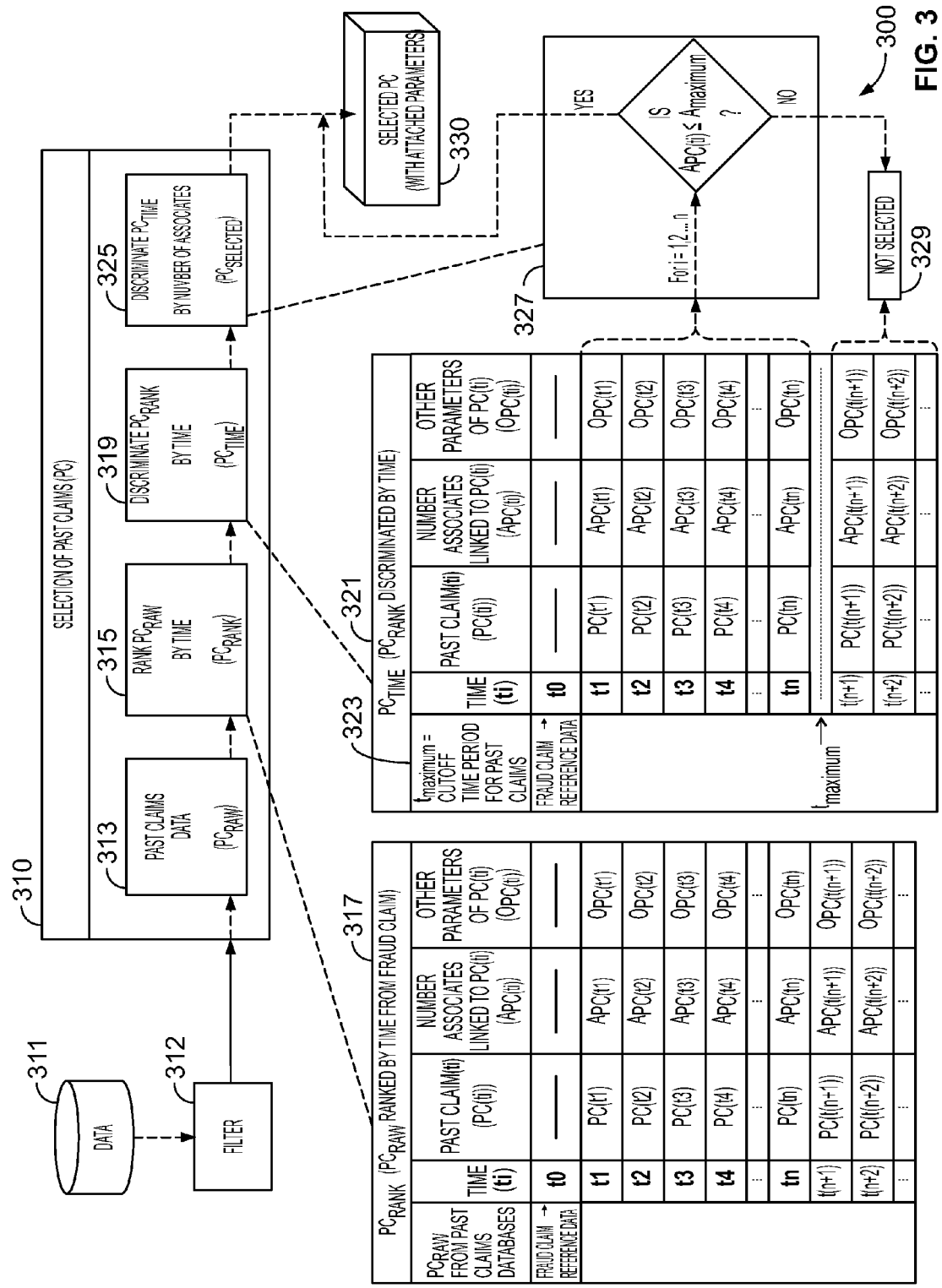
FIG. 3 is an illustrative flow diagram of an additional process in accordance with the principles of the invention.
Figure 4:
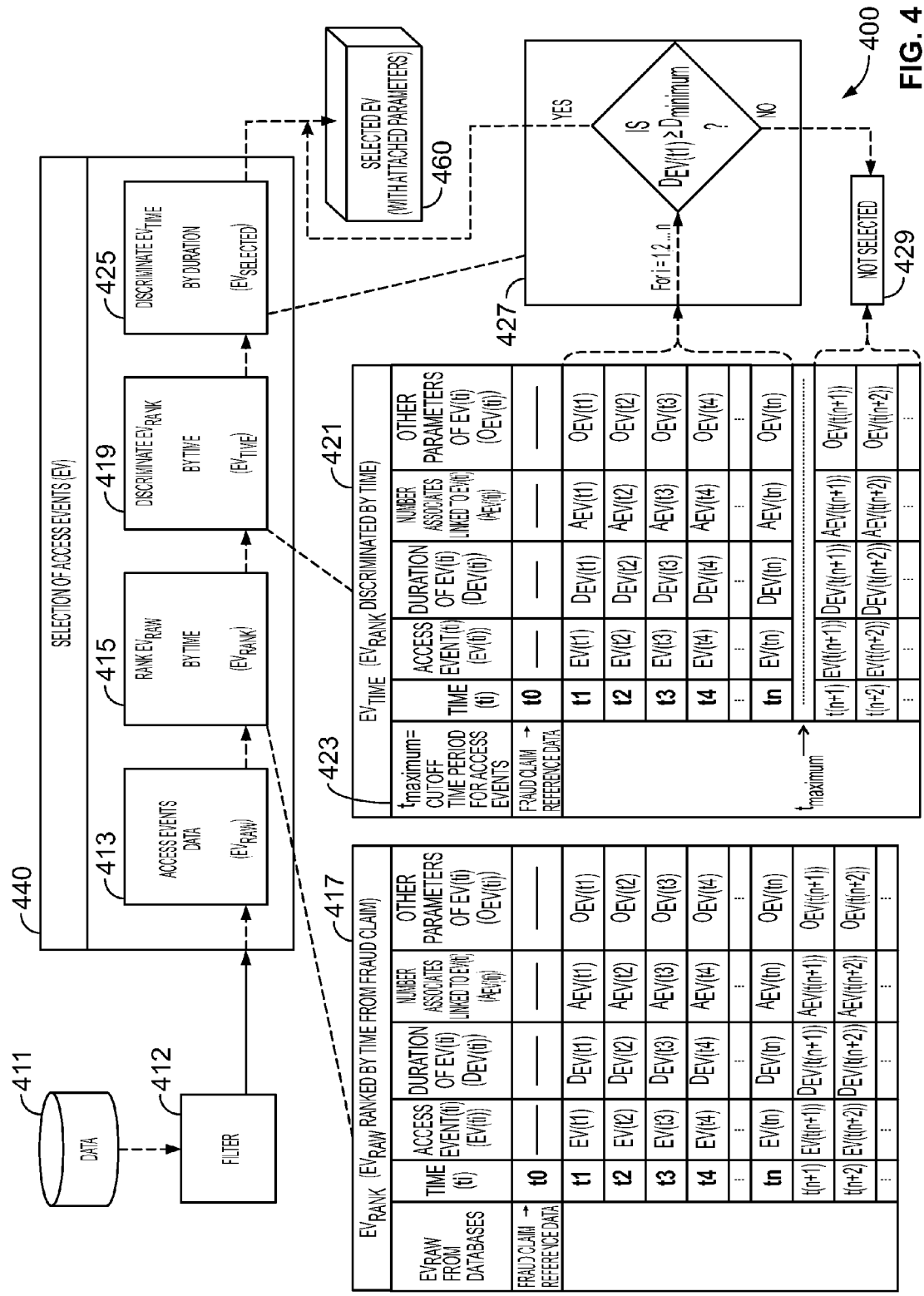
FIG. 4 is an illustrative flow diagram of another additional process in accordance with the principles of the invention.

Processes in accordance with the principles of the invention may include one or more features of the processes illustrated in FIGS. 2-4. For the sake of illustration, the steps of the illustrated processes will be described as being performed by a "system." The "system" may include one or more of the features of the apparatus shown in FIG. 1 and/or any other suitable device or approach. The "system" may be provided by the entity implementing associate risk analysis or by any other suitable individual, organization or modality.

FIG. 2 shows illustrative process 200 for associate risk analysis. Illustrative process-flow is represented by solid arrows. Process-flow may include information-flow of data from process-step to process-step. Illustrative information-flow of data that one or more steps may make use of, be dependent upon, produce and/or be related to—but which may not, itself, be part of the process-flow—is represented by dashed arrows.

At step 202, the system may receive the fraud claim from the customer. The system may subject the claim to security scrutiny steps (not shown) for validation of such data as identity of the customer and of the customer's account.

Step 204 shows a record of the information of the received fraud claim. Record 204 may contain one or more items of information relevant to one or more categories of information. Illustrative titles of information categories of the record may be shown in boldface in the illustration of record 204.

Record 204 may contain information as to the monetary amount alleged to have been frauded.

Record 204 may contain information as to time of the fraud claim. Such time information may contain information from time-stamping upon the claim having been received. The time-stamp may include calendar date and time of day.

Record 204 may contain time information as to the customer's assessment and/or the entity's assessment of the calendar date and time of day of the occurrence of the fraud. For example, the fraud may be assessed to have been perpetrated through a particular entity transaction. The fraudulent transaction may bear a time-stamp, the information of which may be incorporated into record 204.

Record 204 may contain information as to the account alleged to have been frauded. Such account information may include an identification number of the account.

Record 204 may contain information as to the identity of the customer. Such customer information may contain entity internal customer identifying numbers and codes, such as the customer's PIN.

Record 204 may contain information about other details of the fraud claim. Such other details may include particulars of when and/or where the customer may have used the PIN for a time period prior to the fraudulent transaction. Such other details may include identifying information of one or more entity locations, such as bank branches or Automatic Teller Machines, where the fraud may have been perpetrated.

At step 206, the system may begin associate risk analysis process-flow. The implementation of step 206 may be dependent upon or otherwise related to one or more of the information items of one or more of the information categories of record 204. For example, the implementation of step 206 may be related to the information category AMOUNT.

Record 204 information may have to meet one or more entity internal criteria for step 206 to be implemented. The criteria may include the monetary amount of the fraud claim exceeding a minimum value.

At step 208, the system may select an associate for associate risk analysis. Selecting the associate may comprise selecting entity records of information regarding the associate. The information regarding the associate may include identifying information regarding the associate. The information regarding the associate may include information regarding entity activities of the associate. Such information regarding entity activities of the associate may include information regarding access events with which the associate may be linked.

The system may select the associate from a plurality of associates. The plurality may include all entity associates. The plurality may comprise a subset of all entity associates. The subset may be chosen to include entity associates meeting one or more criteria. The criteria may include location, such that, for example, associates in one geographic area, but not in a second geographic area, may be included in the plurality. The criteria may include job description, such that, for example, bank tellers and managers, but not bank guards, may be included in the plurality.

At step 210, the system may select past claims (PC). Each past claim may comprise records of the past claim. The records may contain information items relevant to information categories similar to those that may be shown in boldface in the illustration of record 204.

The records may contain information items relevant to categories of information that may not be shown in the illustration of record 204. Such information items may be recorded in one or more records of one or more past claims as part of the past claims having been received. Alternatively or additionally, such information items may be recorded in one or more records of one or more past claims as part of previous associate risk analysis and/or previous entity internal investigation.

Records of a past claim may contain information as to the number and identity of entity associates connected with the past claim. The connection of an associate with a past claim may comprise the associate having been one of a plurality of associates linked to the fraud. The linkage of an associate to a past claim may comprise the associate being suspected of the past claimed fraud. The linkage of an associate to a past claim may comprise the associate having been in communication, during a time period inclusive of the time of the past claimed fraud, with another associate suspected of that fraud. The linkage of an associate to a past claim may include the associate having accessed the frauded account of the past claim.

At step 210, the system may select a past claim on the basis of one or more criteria. The criteria may include time-related criteria. Such time-related criteria may include the past claim predating the received fraud claim of step 202 by no more than a maximum time period. The criteria may include associate-related criteria. Such associate-related criteria may include the number of associates linked to the past claim being in a range of numbers. The range may, for example, be the lower 25% by number-value of the collection of numbers comprising, for all PC, the number of associates linked to each past claim. The range may be the lower 25% by number-value of the collection of numbers comprising, for all PC meeting the time criterion, the number of associates linked to each of those PC.

Step 230 depicts a set of selected PC. Set 230 of selected PC may comprise PC selected in step 210. Each past claim of set 230 may comprise records of the past claim. The records of the past claim may contain information items relevant to information categories similar to those of PC of step 210, including identifying information regarding entity associates linked with the past claim. The term ATTACHED PC PARAMETERS shown at set 230 may refer to one or more information items contained in the records of one or more PC that may be of set 230.

At step 232, the system may run selection tests on the selected associate. Selection tests of step 232 may test the selected associate for conformance with one or more criteria. The one or more criteria of step 232 are indicated as PC CRITERIA. PC CRITERIA may include the associate being logically linked with at least a method selectable non-zero number of PC that may be of set 230. That non-zero number may be invariant in the course of the system running a given session of the identification means of the selection process of process 200. Such a session may comprise the running of process 200 from an implementation of step 206 to the first encounter thereafter of the system with step 272.

If the associate is not in conformance with PC CRITERIA of step 232, the system may unselect the associate at step 234. From step 234, the system may proceed to step 270. At step 270, a choice of selecting another associate or not selecting another associate may be presented. If the choice taken is to not select another associate, the system may proceed from step 270 to step 272. Step 272 may offer a choice of proceeding to the scoring means of associate risk analysis or not proceeding to those scoring means. If the choice taken is to not proceed to the scoring means, the system may proceed to end process-flow at step 274.

Choice taking such as at step 270 and/or step 272 may be under process control and/or system control and/or may be carried out under other control. Such other control may include the influence of an overseeing modality other than the system running process 200.

If the choice taken at step 270 is to select another associate for associate risk analysis, the system may return to step 208 to select an associate. Each selecting of an associate at step 208 may involve steps (not shown) that may preclude the same associate being subsequently selected within a given session of the identification means. Such steps may include recordation of unique identification data of each associate selected at step 208 and discriminating, upon subsequent return to step 208 within the given session, against selection of an associate bearing that unique identification data.

At step 232, the system may test the selected associate for conformance with PC CRITERIA. If the associate is in conformance with PC CRITERIA of step 232, the system may proceed to step 236. At step 236, the system may attach to the associate some or all of the non-zero number of selected PC with which the associate may be linked. Each of those PC may include its related information items. The term PARAMETERS shown at step 236 may refer to one or more of the information items contained in the records of a past claim that may be of set 230

At step 240, the system may select access events (EV). Each access event may comprise records of the access event. The records may contain information items relevant to information categories similar to those that may be shown in boldface in the illustration of record 204. Information items relevant to the time category may include information of entity time-stamps of access events. Each access event may include such a time-stamp. A time-stamp may include information about the duration of the time-stamped access event.

The records may contain information items relevant to categories of information not shown in the illustration of record 204. The information items may include identifying information of entity associates linked with access events. Linkage of an associate with an access event may be through the associate being linked with one or more other associates who are linked with the access event through having handled one or more of the customer's entity accounts.

Each access event may include such identifying information of each of all associates linked to the access event.

At step 240A and at step 240B, the system may select an access event on the basis of one or more criteria. The criteria may include time-related criteria. Such time-related criteria may include the access event predating the received fraud claim of step 202 by no more than a maximum time period.

At step 240A, the system may select access events involving the customer account of the received claim (EVA).

At step 240B, the system may select access events involving any other entity account of the customer (EVB). The time period of the time-related criteria of step 240B may differ from the time period of the time-related criteria of step 240A.

Step 260A depicts a set of selected EVA. Set 260A of selected EVA may comprise EVA selected in step 240A. Each access event of set 260A may comprise records of the access event. The records of the access event may contain information items relevant to information categories similar to those of EVA of step 240A, including identifying information regarding entity associates linked with the access event. The term ATTACHED EVA PARAMETERS shown at set 260A may refer to one or more information items contained in the records of one or more EVA that may be of set 260A.

Step 260B depicts a set of selected EVB. Set 260B of selected EVB may comprise EVB selected in step 240B. Each access event of set 260B may comprise records of the access event. The records of an access event may contain information items relevant to information categories similar to those of EVB of step 240B, including identifying information regarding entity associates linked with the access event. The term ATTACHED EVB PARAMETERS shown at set 260B may refer to one or more information items contained in the records of one or more EVB that may be of set 260B.

At step 262, the system may run selection tests on the selected associate. Selection tests of step 262 may test the selected associate for conformance with one or more criteria. The one or more criteria of step 262 are indicated as EVA CRITERIA. EVA CRITERIA may include the associate being linked with at least a method selectable non-zero number of EVA that may be of set 260A.

If the associate is not in conformance with EVA CRITERIA of step 262, the system may unselect the associate at step 234. From step 234, the system may proceed to step 270. Process-flow from step 270, as described above, may return to selection of an associate at step 208.

If the associate is in conformance with EVA CRITERIA of step 262, the system may proceed to step 264. At step 264, the system may attach to the associate some or all of the non-zero number of selected EVA with which the associate may be linked. Each of those EVA may include its related information items. The term PARAMETERS shown at step 264 may refer to one or more of the information items contained in the records, which may be of set 260A, of an access event of the frauded account with which the associate may be linked.

At step 266, the system may attach to the associate some or all of the non-zero number of selected EVB with which the associate may be linked. Each of those EVB may include its related information items. The term PARAMETERS shown at step 266 may refer to one or more of the information items contained in the records, which may be of set 260B, of an access event of any of the customer's other entity accounts with which the associate may be linked.

At step 268, the system may add the selected associate to set 282 (shown as SUSPECT SET). Set 282 may be a set of the selected associates that, for a given session of the identification means, conform to both the PC CRITERIA of step 232 and the EVA CRITERIA of step 262. Each criteria-conforming associate of set 282 may have attached to the associate information items related to PC, EVA and EVB to which the associate may be linked.

Set 282 may be reset (not shown) to an empty (null) set containing no associates at the start of the system running a session of the identification means at step 206.

From step 268, the system may proceed to step 270, from which the system may return to step 208 to select another associate for the current session of the identification means. In cyclically stepping through the identification means from step 208 to step 270, the system may continue to select an associate per cycle, and then may unselect the associate should the associate not conform either to PC CRITERIA or to EVA CRITERIA, or may add the associate to the SUSPECT SET should the associate conform both to PC CRITERIA and to EVA CRITERIA. Eventually, each of all the associates in the plurality of associates from which an associate may be selected at step 208 may either have been unselected at step 234 or added at step 268 to set 282. That condition may set the choice to be taken at step 270 (ANOTHER ASSOCIATE ?) to be to not select another associate, that setting of choice under process control and/or system control and/or may be carried out under other control, such other control being as above-mentioned. The system would then proceed to step 272.

Proceeding from step 270 to step 272 may end a session of the identification means. In a given session, the system may choose to proceed from step 270 to step 272 prior to cycling through all the associates in the plurality of associates from which an associate may be selected at step 208.

At step 272, the system may choose to proceed to the scoring means of associate risk analysis.

At step 272, the system may have the option (not shown) of saving set 282 of the session ended upon proceeding to step 272. Such saving of a SUSPECT SET may include the SUSPECT SET being identified by a unique identification. Such identification may include a reference to some or all of the fraud claim information of step 204, and/or to a description of the plurality of associates from which associates were selected at step 208 of the session, and/or to the criteria with which associates in the SUSPECT SET conform, and/or to other information. Such other information may include a reference to the nature and the values of the thresholds used in establishing the criteria used in the session. Such other information may include a reference to the extent of cycling through the plurality of associates from which associates were selected at step 208 of the session. The saved SUSPECT SET may be stored as part of a plurality of saved SUSPECT SETs. The associates of a saved SUSPECT SET may be scored by setting the SUSPECT SET to set 282 of a process 200 that may start at step 276 with the beginning of the scoring means of associate risk analysis.

At step 276, the process may offer the choice (INTRA-SET DISCRIMINATION?) of conducting analysis of the SUSPECT SET to discriminate among subsets within set 282 of criteria-conforming associates or of not conducting such analysis.

If the choice taken at step 276 is to not conduct intra-set discrimination of the SUSPECT SET, the system may proceed to step 290. At step 290, an associate of a set may be scored relative to some or all of the associates of the set. Such scoring may be attached to the associates of the set. Such scoring may differentiate among associates of a set.

At step 292, an associate of set 282 may be scored relative to some or all of the associates of set 282.

If the choice taken at step 276 is to conduct intra-set discrimination of the SUSPECT SET, the system may proceed to step 278. At step 278, discrimination among subsets of the SUSPECT SET may be conducted. Such discrimination may include an analysis of PC parameters attached to associates of set 282. The analysis may include ranking associates by the number of PC attached to each associate. The analysis may include ranking the numbers of PC so attached. Subsets of set 282 may be discriminated on the basis of the rankings. For example, associates of set 282 attached to a number of PC that may be in the lower 25% of all the numbers of PC attached to all the associates of set 282, may comprise a subset.

At step 280, the system may retain a subset from among subsets discriminated in step 278. Building on the immediately preceding example, at step 280, the system may retain the subset of associates attached to a number of PC that may be in the lower 25% of all the numbers of PC attached to all the associates of set 282. Several subsets discriminated in step 278 may be retained in step 280.

The subset(s) retained in step 280 may comprise SUSPECT SUBSET(S) at step 284. Set 284 may contain subset(s) retained in step 280. Each associate contained in each subset of set 284 may have attached to the associate information items attached to the same associate of set 282.

From step 280, the system may proceed to score the associates at step 290. At step 294, an associate of a subset of SUSPECT SUBSET(S) may be scored relative to some or all of the associates of the subset. Building on the immediately preceding example, at step 294, the system may score an associate relative to associates in the subset of associates attached to a number of PC that may be in the lower 25% of all the numbers of PC attached to all the associates of set 282.

At step 294, an associate of a subset may be scored by one or more analyses relative to the subset. An associate of SUSPECT SUBSET(S) be may be scored by one or more analyses relative to one or more subsets. One of the subsets of set 284 may be set 282.

At step 296, associates scored in step 290 may be information-transferred to the entity division of internal investigation for investigation of the received fraud claim of step 202. Such internal investigation is shown at step 298.

The transfer at step 296 may include transfer of one or more information items attached to an associate. Such information items may include scores attached to an associate. The transfer may include information referring to the criteria by which associates were scored. The transfer may include information referring to the criteria by which SUSPECT SUBSET(S) were discriminated and selected.

At step 298, the information of the transfer at step 296 may be correlated with the fraud claim information of record 204.

FIG. 3 shows illustrative process 300. The system may execute one or more of the steps of process 300 in connection with the execution of step 210 of process 200 (shown in FIG. 2 as SELECTION OF PAST CLAIMS (PC)).

At step 312, data of past claims (PC) may be filtered by filter 312. Such data may be derived from database 311. Database 311 may include past claim databases. Filtering at step 312 may be such that data of a past claim that conforms with one or more criteria of impact may be passed to step 310, and data of a past claim that does not so conform may not be passed to step 310. Such criteria of impact may include the claimed amount of the past claim being above a minimum monetary amount. The minimum monetary amount may, for example, be $250.

At step 310, the system may select PC. Each past claim may comprise records of the past claim. Steps 313, 315, 319 and 325 may represent substeps of step 310.

At step 313, PC data that the system may pass to step 310 may be shown as $PC_{RAW}$. The system may pass $PC_{RAW}$ to step 315.

At step 315, passed data may be ranked by time. Ranked data may be shown in step 315 as $PC_{RANK}$. Ranking may include time-ordering of PC data by time elapsed from the time of the received fraud claim of step 202 (shown in FIG. 2). Time of the received fraud claim may be derived from fraud claim information of record 204 (shown in FIG. 2). Time of a past claim may be included in information items of PC data of the past claim passed to step 310.

Step 317 shows a tabular representation of data that may comprise $PC_{RANK}$. In table 317, data are shown in columns representing information categories. Information categories may include time of a claim and identification of the claim. Information categories may include a number of associates linked to the claim. Information categories may include other parameters of the claim. Such other parameters may include identification of one or more associates linked to the claim. Such other parameters may include a monetary amount of fraud claimed in the claim.

In table 317, time of the fraud claim is shown as t0 in a row marked as FRAUD CLAIM REFERENCE DATA. The time of PC may be time-ordered in reference to t0. In generalized format, time of a generalized time-ordered past claim is shown as ti, an identification of that generalized past claim is shown as PC(ti), a number of associates linked to that generalized past claim is shown as $A_{PC(ti)}$, and other parameters of that generalized past claim are shown as $O_{PC(ti)}$. Time of the time-ordered past claim closest in time prior to t0 is shown as t1, an identification of that past claim is shown as PC(t1), a number of associates linked to that past claim is shown as $A_{PC(t1)}$, and other parameters of that past claim are shown as $O_{PC(t1)}$. The ti next closest in time prior to t0 before t1 is shown as t2, with the index-letter increasing by 1 for each successively descending row of time-ordered data. The notation tn may represent a particular ti greater in time prior to t0 than t4. The notation t(n+1) may represent a particular ti greater in time prior to t0 than tn. The vertical dots shown in columns between the row of t4 and the row of tn and in columns of the bottom-most row may indicate one or more rows of time-ordered data, with the index-letter i increasing by 1 for each successive row.

The system may pass $PC_{RANK}$ from step 315 to step 319. At step 319, passed data may be discriminated by time. Time-discriminated data maybe shown in step 319 as $PC_{TIME}$. Time-discrimination may include selecting PC data to be passed to step 325 on the basis—using the notations of table 317—of ti being no greater than a maximum time prior to t0 for a given PC(ti). Within the context of process 300, that maximum time may be designated as $t_{maximum}$.

Step 321 shows a tabular representation of data that may comprise $PC_{TIME}$. In table 321, data are shown in columns representing information categories that may be similar to those of table 317.

In table 321, detail 323 shows $t_{maximum}$ as equal to a cutoff time-period prior to t0. The cutoff time-period may, for example, be 14 days. Below detail 323, $t_{maximum}$ is shown, relative to the vertical arrangement of rows of data, between tn and t(n+1). The ti given as tn may, then, represent the greatest ti of a PC(ti) not greater than $t_{maximum}$. The ti given as t(n+1) may, then, represent the smallest ti of a PC(ti) greater than $t_{maximum}$.

Data of PC(ti) with ti greater than $t_{maximum}$ may be passed to step 329. At step 329, such data are shown as NOT SELECTED.

$PC_{TIME}$ of step 319 that may be represented in table 321 as data of PC(ti) with ti not greater than $t_{maximum}$, may be passed from step 319 to step 325. At step 325, passed data may be discriminated by one or more criteria. Criteria-discriminated data may be shown in step 325 as $PC_{SELECTED}$. Criteria-discrimination in $PC_{SELECTED}$ may include selecting data to be passed to step 330 on the basis of $A_{PC(ti)}$ being no greater than a maximum number of associates. Within the context of process 300, that maximum number of associates may be designated as $A_{maximum}$.

Criteria of discrimination other than a relative value of $A_{PC(ti)}$ to $A_{maximum}$ may be used in step 325. Discriminating by such criteria may include comparison of $O_{PC(ti)}$ to relevant values.

Step 327 may show a branched process representation of a criterion-discrimination of step 325. Step 327 is shown indexed to the indexing shown in table 321.

At step 327, data represented in table 321 as PC(ti) with ti not greater than $t_{maximum}$, may be passed to the branched process. Such PC(ti) data may be passed to the branched process and evaluated one record at a time, stepping through values of the index i by successive increase of i by 1 from i=1 to i=n.

Within the context of table 321 and step 327, a record may contain information items in a row of data of table 321. Evaluation of the record in step 327 may be represented as comparison of the value of $A_{PC(ti)}$ of PC(ti) to $A_{maximum}$. In the evaluation shown in the branched process of step 327, records of PC(ti) with $A_{PC(ti)}$ greater than $A_{maximum}$ may be passed to step 329. Records of PC(ti) with $A_{PC(ti)}$ not greater than $A_{maximum}$ may be passed to step 330.

Step 330 depicts a set of $PC_{SELECTED}$. Set 330 of selected PC may comprise the criteria-discriminated $PC_{SELECTED}$, the system may pass from step 325 to step 330, for which the process of discrimination may be represented by the branched process of step 327. The term ATTACHED PARAMETERS shown at set 330 may refer to one or more of the information items of set 330 contained in the records of a past claim.

Set 330 may correspond to set 230 of process 200 (shown in FIG. 2).

FIG. 4 shows illustrative process 400. The system may execute one or more of the steps of process 400 in connection with the execution of step 240 of process 200 (shown in FIG. 2 as SELECTION OF ACCESS EVENTS (EV).

At step 412, data of access events (EV) of accounts may be filtered by filter 412. Such data may be derived from database 411. Database 411 may include customer/accounts databases and transactional databases. Filtering at step 412 may be such that data of an access event that conforms with one or more criteria may be passed to step 440, and data of an access event that does not so conform may not be passed to step 440. The criteria may include the account of the access event being the account of the fraud claim of step 202 of process 200 (shown in FIG. 2); such EV may be designated EVA. The criteria may include the account of the access event being not the account of the fraud claim of step 202 of process 200 but, rather, another account of the customer of the fraud claim; such EV may be designated EVB. The customer of the fraud claim may be identified from information derived from fraud claim information of record 204 (shown in FIG. 2).

At step 440, the system may select EV. Each access event may comprise records of the access event. Steps 413, 415, 419 and 425 may represent substeps of step 440.

At step 413, EV data that the system may pass to step 440 is shown as $EV_{RAW}$. The system may pass $EV_{RAW}$ to step 415.

At step 415, passed data may be ranked by time. Ranked data may be shown in step 415 as $EV_{RANK}$. Ranking may include time-ordering of EV data by time elapsed from the time of the received fraud claim of step 202 (shown in FIG. 2). Time of the received fraud claim may be derived from fraud claim information of record 204 (shown in FIG. 2). Time of an access event may be included in information items of EV data of the access event passed to step 440.

Step 417 shows a tabular representation of data that may comprise $EV_{RANK}$. In table 417, data are shown in columns representing information categories. Information categories may include time of an access event and identification of the access event. Information categories may include duration of the access event. Information categories may include a number of associates linked to the access event. Information categories may include other parameters of the access event. Such other parameters may include identification of one or more associates linked to the access event.

In table 417, time of the fraud claim is shown as t0 in a row marked as FRAUD CLAIM REFERENCE DATA. The time of EV may be time-ordered in reference to t0. In generalized format, time of a generalized time-ordered access event is shown as ti, an identification of that generalized access event is shown as EV(ti), a duration of that generalized access event is shown as $D_{EV(ti)}$, a number of associates linked to that generalized access event is shown as $A_{EV(ti)}$, and other parameters of that generalized access event are shown as $O_{EV(ti)}$. Time of the time-ordered access event closest in time prior to t0 is shown as t1, an identification of that access event is shown as EV(t1), a duration of that access event is shown as $D_{EV(t1)}$, a number of associates linked to that access event is shown as $A_{EV(t1)}$, and other parameters of that access event are shown as $O_{EV(t1)}$.

In FIG. 4, the mode of indexing t to the index-letter i, the use of notation tn and t(n+i), and the use of vertical dots within rows, may match the mode of indexing t to the index-letter i, the use of notation tn and t(n+i), and the use of vertical dots within rows, respectively, of FIG. 3.

The system may pass $EV_{RANK}$ from step 415 to step 419. At step 419, passed data may be discriminated by time. Time-discriminated data may be shown in step 419 as $EV_{TIME}$. Time-discrimination may include selecting EV data to be passed to step 425 on the basis—using the notations of table 417—of ti being no greater than a maximum time prior to t0 for a given EV(ti). Within the context of process 400, that maximum time may be designated as $t_{maximum}$. The $t_{maximum}$ for EV of process 400 may be different from the $t_{maximum}$ for PC of process 300. The $t_{maximum}$ for EVA may be different from the $t_{maximum}$ for EVB.

Step 421 shows a tabular representation of data that may comprise $EV_{TIME}$. In table 421, data are shown in columns representing information categories that may be similar to those of table 417.

In table 421, detail 423 shows $t_{maximum}$ as equal to a cutoff time-period prior to t0. The cutoff time-period for EVA and the cutoff time-period for EVB may be different. The cutoff time-period for EVA may, for example, be 45 days. The cutoff time-period for EVB may, for example, be six months. Below detail 423, $t_{maximum}$ is shown, relative to the vertical arrangement of rows of data, between tn and t(n+1). The ti given as tn may, then, represent the greatest ti of an EV(ti) not greater than $t_{maximum}$. The ti given as t(n+1) may, then, represent the smallest ti of an EV(ti) greater than $t_{maximum}$.

Data of EV(ti) with ti greater than $t_{maximum}$ may be passed to step 429. At step 429, such data are shown as NOT SELECTED.

$EV_{TIME}$ of step 319 that may be represented in table 421 as data of EV(ti) with ti not greater than $t_{maximum}$, may be passed from step 419 to step 425. At step 425, passed data may be discriminated by one or more criteria. Criteria-discriminated data may be shown in step 425 as $EV_{SELECTED}$. Criteria-discrimination in $EV_{SELECTED}$ may include selecting data to be passed to step 460 on the basis of $D_{EV(ti)}$ being no less than a minimum duration of the access event. Within the context of process 400, that minimum duration may be designated $D_{minimum}$.

Criteria of discrimination other than a relative value of $D_{EV(ti)}$ to $D_{minimum}$ may be used in step 425. Discriminating by such criteria may include comparison of $O_{EV(ti)}$ to relevant values.

Step 427 may show a branched process representation of a criterion-discrimination of step 425. Step 427 is shown indexed to the index shown in table 421.

At step 427, data represented in table 421 as EV(ti) with ti not greater than $t_{maximum}$ may be passed to the branched process. Such EV(ti) data may be passed to the branched process and evaluated one record at a time, stepping through values of the index i by successive increase of i by 1 from i=1 to i=n.

Within the context of table 421 and step 427, a record may contain information items in a row of data of table 421. Evaluation of the record in step 427 may be represented as comparison of the value of $D_{EV(ti)}$ of EV(ti) to $D_{minimum}$. In the evaluation shown in the branched process of step 427, records of EV(ti) with $D_{EV(ti)}$ less than $D_{minimum}$ may be passed to step 429. Records of EV(ti) with $D_{EV(ti)}$ not less than $D_{minimum}$ may be passed to step 460.

Step 460 depicts a set of $EV_{SELECTED}$. Set 460 of selected EV may comprise the criteria-discriminated $EV_{SELECTED}$ the system may pass from step 425 to step 460, for which the process of discrimination may be represented by the branched process of step 427. The term ATTACHED PARAMETERS shown at set 460 may refer to one or more of the information items of set 460 contained in the records of an access event. For EVA, set 460 may correspond to set 260A of process 200 (shown in FIG. 2). For EVB, set 460 may correspond to set 260B of process 200 (shown in FIG. 2).

As will be appreciated by one of skill in the art, the invention described in the aforementioned steps and parts of the figures and in the specification herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Thus, apparatus, methods and media for associate risk analysis according to the invention have been provided. Persons skilled in the art will appreciate that the present invention can be practiced in embodiments other than the described embodiments, which are presented for purposes of illustration rather than of limitation, and that the present invention is limited only by the claims that follow.

What is claimed is:

1. An apparatus for executing a selection of entity associates for an entity internal investigation, the apparatus comprising:
a receiving device configured to receive from a customer a fraud claim in connection with an entity account that is included in a plurality of entity accounts, the customer being logically linked with the entity account; and
a digital logical processing device configured to identify an entity associate that conforms to a first criterion and a second criterion,
the first criterion being a logical link between the associate and an access event, the access event being an accessing of the entity account; and
the second criterion being a logical link between the associate and a number of past claims that is greater than a threshold number, each of the past claims corresponding to a one of the plurality of entity accounts.

2. The apparatus of claim 1 wherein, when the threshold number is a first threshold number, the identifying comprises identifying an entity associate that conforms to a third criterion, the third criterion being that the past claims include a past claim that is logically linked with a number of entity associates that is no greater than a second threshold number.

3. The apparatus of claim 1 further comprising the logical processing device configured to score the associate, the scoring being based at least in part on the number of past claims.

4. The scoring of claim 3 wherein:
each of the past claims has an entity internal impact, and
the scoring is based at least in part on the impact.

5. The scoring of claim 4 wherein the impact corresponds to a monetary valuation.

6. The scoring of claim 3 wherein the scoring is based at least in part on a duration of the access event.

7. The scoring of claim 3 wherein, when:
the entity account is a first entity account;
the plurality of entity accounts includes a second entity account with which the customer has been logically linked;
the access event is a first access event; and
the associate has been logically linked to a second access event, the second access event being an accessing of the second entity account,
the scoring is based at least in part on a time elapsed between the second access event and the first access event.

8. The scoring of claim 7 wherein, when the second access event is one of a plurality of second access events with which the associate has been linked, the scoring is based at least in part on a time elapsed between access events.

9. An article of manufacture comprising a non-transitory computer usable medium having computer readable program code embodied therein, the code when executed by one or more processors causing a computer to select entity associates for an entity internal investigation, the computer readable program code in the article comprising:
computer readable program code that when executed causes the computer to receive from a customer a fraud claim in connection with an entity account that is included in a plurality of entity accounts, the customer being logically linked with the entity account; and
computer readable program code that when executed causes the computer to identify an entity associate that conforms to a first criterion and a second criterion,
the first criterion being a logical link between the associate and an access event, the access event being an accessing of the entity account; and
the second criterion being a logical link between the associate and a number of past claims that is greater than a threshold number, each of the past claims corresponding to a one of the plurality of entity accounts.

10. The article of claim 9 wherein the past claims include a past claim that predates the fraud claim by less than a time period.

11. The article of claim 9 wherein, when the threshold number is a first threshold number, the identifying comprises identifying an entity associate that conforms to a third criterion, the third criterion being that the past claims include a past claim that is logically linked with a number of entity associates that is no greater than a second threshold number.

12. The article of claim 9 wherein the identifying further comprises scoring the associate, the scoring being based at least in part on the number of past claims.

13. The article of claim 12 wherein the scoring is based at least in part on a number of customers logically linked with the past claims.

14. The article of claim 12 wherein the scoring is based at least in part on a time elapsed between the access event and the fraud claim.

15. The article of claim 14 wherein, when the access event is one of a plurality of access events with which the associate has been logically linked, the scoring is based at least in part on a time elapsed between access events.

16. A method for selecting entity associates for an entity internal investigation, the method comprising:
   using a receiver device for receiving from a customer a fraud claim in connection with an entity account that is included in a plurality of entity accounts, the customer being logically linked with the entity account; and
   using a logic processing device for identifying an entity associate that conforms to a first criterion and a second criterion,
      the first criterion being a logical link between the associate and an access event, the access event being an accessing of the entity account; and
      the second criterion being a logical link between the associate and a number of past claims that is greater than a threshold number, each of the past claims corresponding to a one of the plurality of entity accounts.

17. The method of claim 16 wherein the access event predates the fraud claim by less than a time period.

18. The method of claim 16 wherein, when the threshold number is a first threshold number, the identifying comprises identifying an entity associate that conforms to a third criterion, the third criterion being that the past claims include a past claim that is logically linked with a number of entity associates that is no greater than a second threshold number.

19. The method of claim 16 further comprising using the logic processing device for scoring the associate, wherein the scoring is based at least in part on the number of past claims.

20. The method of claim 19 wherein the scoring is based at least in part on a number of entity associates logically linked with each of the past claims.

21. The method of claim 19 wherein the scoring is based at least in part on a time elapsed between the access event and the fraud claim.

22. The method of claim 19 wherein, when
   the entity account is a first entity account;
   the plurality of entity accounts includes a second entity account with which the customer has been logically linked;
   the access event is a rust access event; and
   the associate has been logically linked to a second access event, the second access event being an accessing of the second entity account,
   the scoring is based at least in part on a time elapsed between the second access event and the first access event.

23. The method of claim 22 wherein the scoring is based at least in part on a duration of the second access event.

* * * * *